US010990653B2

(12) United States Patent
Gan et al.

(10) Patent No.: US 10,990,653 B2
(45) Date of Patent: Apr. 27, 2021

(54) METHOD AND APPARATUS FOR LIMITING A NUMBER OF SIMULTANEOUS USERS OF SOFTWARE

(71) Applicant: MOTOROLA SOLUTIONS, INC., Chicago, IL (US)

(72) Inventors: Guo Dong Gan, Kuala Lumpur (MY); Swee Yee Soo, Gelugor (MY); Moheinvarman Subramaniam, Batu Ferringhi (MY); Wei Lun Chan, Simpang Ampat (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 145 days.

(21) Appl. No.: 16/546,435

(22) Filed: Aug. 21, 2019

(65) Prior Publication Data
US 2021/0056178 A1 Feb. 25, 2021

(51) Int. Cl.
*G06F 21/10* (2013.01)
*G06F 21/12* (2013.01)
*H04W 12/30* (2021.01)

(52) U.S. Cl.
CPC .......... *G06F 21/105* (2013.01); *G06F 21/121* (2013.01); *H04W 12/35* (2021.01); *G06F 2221/0775* (2013.01)

(58) Field of Classification Search
CPC .................. G06F 21/105; G06F 21/121; G06F 2221/0775; H04W 12/35

USPC .......................................................... 726/17
See application file for complete search history.

(56) References Cited

U.S. PATENT DOCUMENTS

| 7,636,693 | B2 | 12/2009 | Faur et al. |
| 7,818,020 | B1* | 10/2010 | Manroa ............... H04L 61/1594 455/519 |
| 8,214,470 | B2 | 7/2012 | Quilty |
| 2006/0294019 | A1 | 12/2006 | Dayan et al. |
| 2016/0255490 | A1* | 9/2016 | Mufti .................... H04W 60/04 370/328 |
| 2017/0118597 | A1* | 4/2017 | Swirsky ................ H04W 76/10 |

OTHER PUBLICATIONS

IOS Software Upgrade FAQ: "If you can't connect to the App Store, iTunes Store, or Apple Books", https://support.apple.com/en-sg/HT201400, published date: Oct. 1, 2018, downloaded from the internet: Aug. 21, 2019, all pages.

* cited by examiner

*Primary Examiner* — Peter C Shaw

(57) ABSTRACT

A user's device will periodically send short PTT bursts to an application talkgroup and wait for an acknowledgement (ACK). The acknowledgement will allow the software application to execute the application as part of the site license. If the site license is used up (i.e., a maximum number of simultaneous users has been reached), then a negative acknowledgment (NACK) will be sent to the device, and the software will deny the user access to the software.

9 Claims, 7 Drawing Sheets

METHOD AND APPARATUS FOR LIMITING A NUMBER OF SIMULTANEOUS USERS OF SOFTWARE

BACKGROUND OF THE INVENTION

A site license is a type of software license that allows the user to install/execute a software package in several devices, such as at a particular site (facility), across devices, or across a corporation. Depending on the amount of fees paid, the license may be unlimited or may limit simultaneous use of the software to a certain number of users. A site license that limits the number of simultaneous uses of software is sometimes referred to as a concurrent site license.

For example, assume a public-safety entity purchased a site license for crime-prediction software, and installed this software on devices used by public-safety officers. If a concurrent site license was purchased, that license may restrict the simultaneous use of the software to a particular number of devices (e.g., 50).

Because push-to-talk (PTT) functionality is so ubiquitous in the public-safety realm, it would be beneficial if PTT functionality and a talkgroup selector could be used to control access to software on a device as part of a concurrent site license management system.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
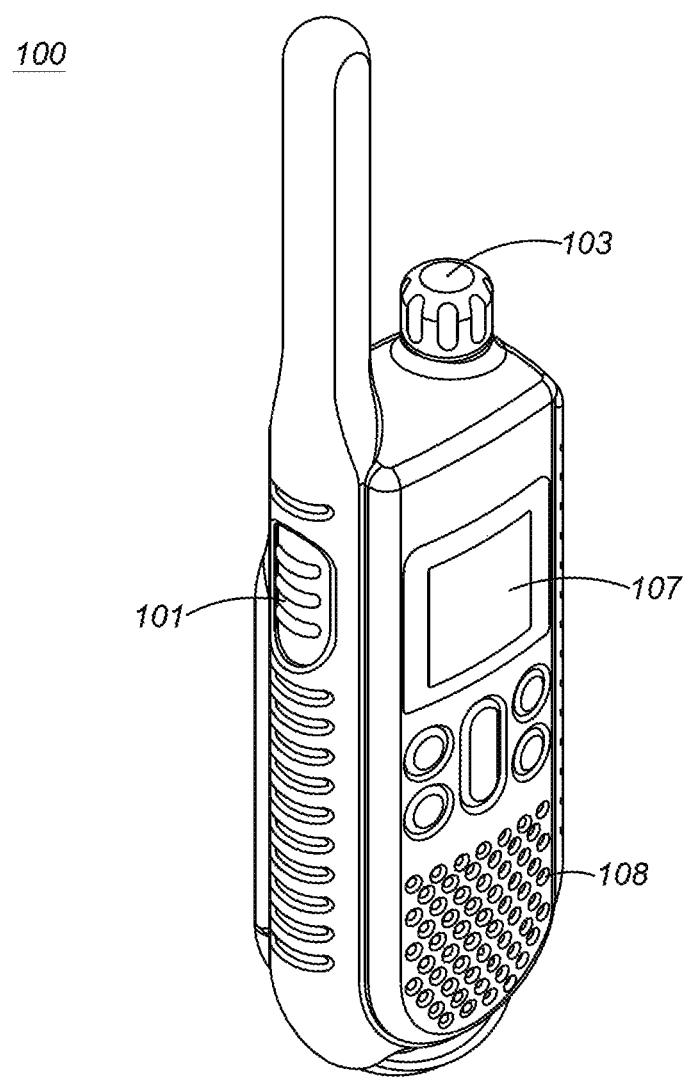
FIG. 1 illustrates push-to-talk (PTT) radio.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to use PTT functionality to give access to software as part of a concurrent site license, a method and apparatus for enforcing a concurrent site license is provided herein. During operation a "channel-change" knob (sometimes referred to as a selector knob) on a radio will be utilized to cycle between and select talkgroups/channels for over-the-air voice transmission. Additionally, the channel-change knob on the radio will be used to cycle between and select applications stored on the radio. A push-to-talk button on the radio will serve as a trigger to collect voice input for a selected talkgroup for over-the-air transmission when a talkgroup is selected. When the "application" talkgroup is selected, the application registers the user on an application talkgroup reserved for use by the application. The user's device will periodically send short PTT bursts to the application talkgroup and wait for an acknowledgement (ACK). The acknowledgement will allow the software application to execute the application as part of the site license. If the site license is used up (i.e., a maximum number of simultaneous users has been reached), then a negative acknowledgment (NACK) will be sent to the device, and the software will deny the user access to the software.

A server will be provided that tracks a number of users of a particular application. The server will determine the number of users of an application by determining a number of users registered on the application talkgroup. If a device attempts to register on the talkgroup after a maximum number of users are concurrently using the software, then a negative acknowledgment (NACK) will be sent to the device. However, if the maximum number of users concurrently using the software has not been met, then an ACK will be sent to the device.

In this particular embodiment, an ACK or NACK comprises an actual transmission of data, however, in alternate embodiments of the present invention the ACK or NACK may comprise an "absence" of transmission. So for example, if a device attempts to use an application, and fails to receive an ACK, it may be considered as receiving a NACK. In an alternate embodiment, if a device attempts to use an application, and fails to receive a NACK, it may be considered as receiving an ACK. Additionally, because ACKs and NACKs may be sent over a talkgroup that is shared by all users currently using a software application, the ACKs and NACKs may comprise a device identification (ID) so individual devices can determine the device that the ACK or NACK is directed towards.

As known in the art, PTT devices are commonly employed by public safety personnel, air traffic controllers, emergency workers, construction site workers, scientists, and others who need to be in constant and readily available voice communication. PTT, also known as press-to-transmit, is a method of communicating using half-duplex communication lines. A PTT button may be pressed to switch a device from a voice reception mode to a transmit-mode. For example, when a channel/talkgroup is selected, one operator may depress the PTT button on her device and speak into the device's microphone. The speech is converted into an appropriate format and transmitted to one or more other devices over the channel/talkgroup, where the operators of those other devices hear the first operator speak through their device's speaker.

When communicating over a talkgroup/channel, each PTT radio typically communicates with one group of radios (talkgroup) at a time. Even though a radio may switch between talkgroups, the radio may still only be able to communicate with a single talkgroup at a time. For example, a firefighter may be affiliated with or using a firefighter talkgroup and a police officer may be affiliated with or using a police talkgroup. Talkgroups outside of those currently listened to by a radio will not be heard by other radios or consoles. Thus, a radio speaker will only output audio from a talkgroup associated with the radio, and the radio's transmission will only be heard by those communicating on a same talkgroup. In addition of communication over a single talkgroup on a single wireless communication over an air interface, it can also communicate over multiple talkgroups over multiple wireless communication over air interface which also known as converge platforms such as LMR and WiFi, LMR and LTE, etc.

Instead of assigning, for example, a radio channel to one particular organization (group) at a time, users are instead assigned to a logical grouping, a "talkgroup". When any user in that group wishes to converse with another user in the talkgroup, a vacant radio channel is found automatically by the system and the conversation takes place on that channel. Many unrelated conversations can occur on a channel, making use of the otherwise idle time between conversations. A control channel coordinates all the activity of the radios in the system. The control channel sends packets of data to enable one talkgroup to talk together, regardless of frequency.

Considering the above, when a public-safety officer switches to a particular application using the selector knob, the application may automatically execute. Short data bursts will be transmitted to a server from the application. These short data bursts are used to request permission to use the application. If the server determines that executing the application will not violate a site license, then an ACK is sent to the radio by the server. Once the radio receives the ACK, the software will execute. As long as the software is utilized, periodic ACKs will be sent to the server (e.g., one every minute), indicating that the software is still in use. If an ACK is not received by the server after a predetermined period of time, the server will assume the software is not being executed. Since many devices may be transmitting ACKs over the application talkgroup, both the ACKs and the NACK s should be transmitted in a sub-audible fashion so that users do not hear the transmissions.

As is evident, the selector knob on the radio is used for both selecting an application and selecting a channel or a talkgroup (as discussed, a talkgroup is an assigned group of radios on a trunked radio system). When either an application or talkgroup is "selected", the application or talkgroup name will be displayed "highlighted". Highlighting an application or talkgroup name may comprise displaying the font in bold, italics, in a particular color, surrounded by an outline (e.g., a box), or any other form of displaying the application or talkgroup name in a different manner than the non-highlighted applications or talkgroups.

In addition, if the PTT button is pressed while an application talkgroup is selected, the voice will be routed to the application as described in U.S. patent application Ser. No. 16/248,938, entitled "Push to Talk to Applications", incorporated by reference herein. Thus, the PTT button on the radio is used for both selecting a voice input for an application and transmitting the voice-input over the air on the channel or talkgroup. The decision on whether or not to use the voice as an input to an application, or to send the voice over-the-air depends on whether or not a channel/talkgroup is selected, or an application is selected using the selector knob.

FIG. 1 illustrates push-to-talk (PTT) radio 100. As shown, radio 100 comprises PTT button 101, knob 103, display/screen 107, and speaker/microphone 108. PTT button 101 comprises a standard button that may be mechanical or virtual (touchscreen user interface button). When a talkgroup or channel is selected via knob 103 and PTT button 101 is pressed, radio 100 transitions from a listening state, to a transmit state, transmitting received voice over the selected talkgroup (herein the term "talkgroup" will be meant to comprise both a talkgroup and/or a physical channel). When an application is selected via knob 103 and PTT button 101 is pressed, radio 100 transitions from a listening state to a "voice collecting" state and inputs the collected voice into the selected application. As mentioned above, the voice may be converted to text prior to being input into the selected application. If the application has no use for voice input, then the voice collected will simply be discarded, or alternatively, no voice will be collected.

Display 107 comprises a way of conveying (e.g., displaying) a list of applications and talkgroups as well as the knob-selection information to the user. Display 107 may simply comprise a liquid-crystal display (LCD), or may comprise additional types of displays (e.g., a light-emitting diode (LED) display). Display 107 may also comprise a touch-screen display that provides both an output interface and an input interface between the device and a user. Display 107 may also provide graphics, video, and any combination thereof.

Microphone 108 comprises a standard microphone 108 for converting sound waves to electrical signals for text-to-speech conversion, transmission over a talkgroup, recording, and/or input into an application.

Knob 103 includes an internal sensor (not shown) as known in the art to provide position and direction information to logic circuitry to communicate knob position for selection of menu items. Since the knob is preferably a continuous rotational device having an infinite range of rotational motion, an encoder, rather than continuous turn potentiometer, is a suitable sensor due to the encoder's accuracy and lower errors when transitioning between maximum and minimum values. Other types of sensors can, of course, be used in other embodiments, including magnetic sensors, analog potentiometers, etc. Knob 103 is configured such that rotation of knob 103 serves to "walk" down a list of applications and talkgroups, switching between talkgroups and applications as the knob rotates. Knob 103 is approximately a cylindrical object. Knob 103 can alternatively be implemented as a variety of different objects, including conical shapes, spherical shapes, dials, cubical shapes, rods, etc., and may have a variety of different textures on their surfaces, including bumps, lines, or other grips, or projections or members extending from the circumferential surface.

A user preferably grips or contacts the circumferential surface of knob 103 and rotates it a desired amount to scroll through menu items (the menu items comprise listed talkgroups and applications). A selected menu item is highlighted. Once knob 103 is rotated to highlight a particular talkgroup/application, any activation (pushing) of the PTT button 101 will cause radio 100 to function as described above.

Figure 2:
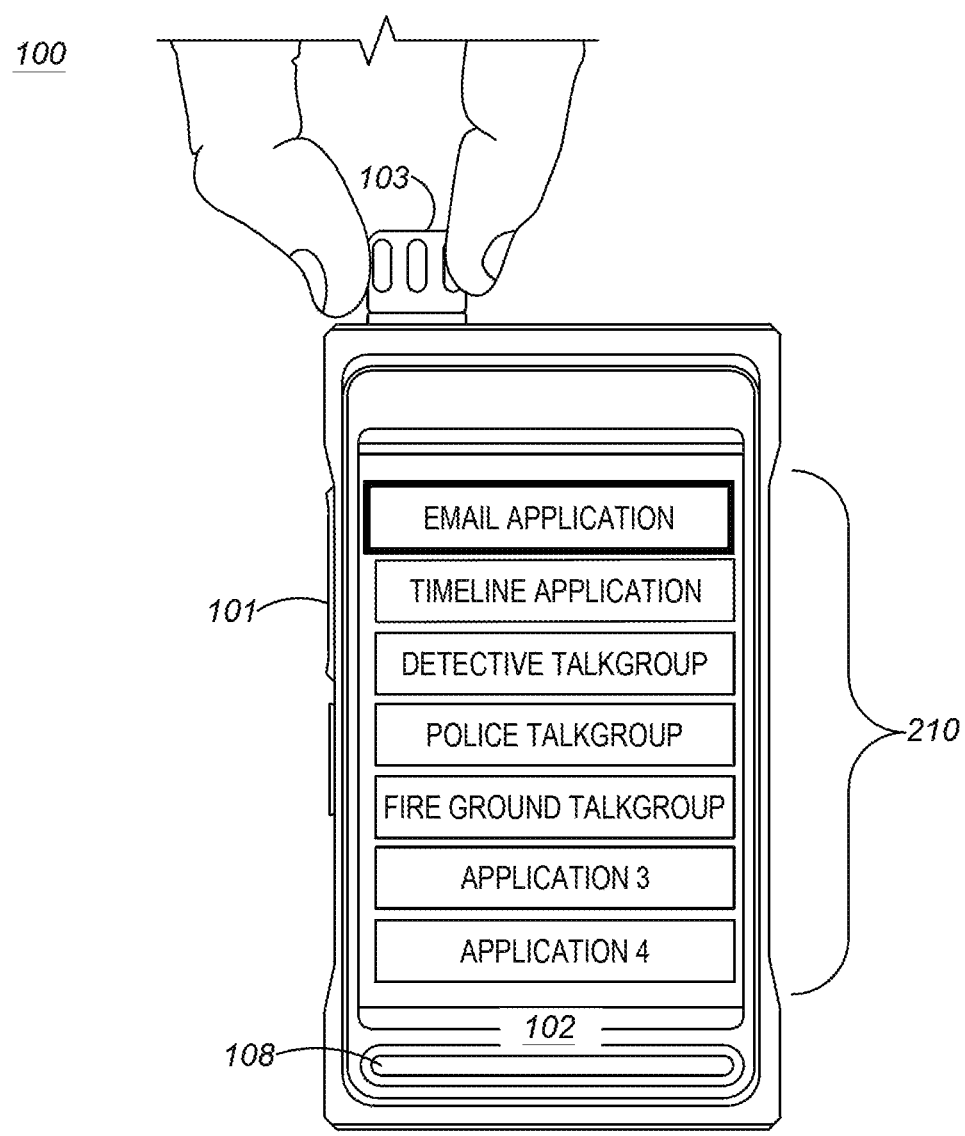
FIG. 2 illustrates PTT radio with a menu of talkgroups and applications.

It should be noted that display 102 will preferably display both the names of the talkgroups and particular applications in a list. For example, as shown in FIG. 2, the Police Talkgroup, Detective Talkgroup, and the Fire Ground talkgroup may be displayed in a list 210, so when one of the talkgroups is highlighted, communications to other police officers, or firemen take place over the talkgroup upon the pushing of the PTT button 101. However, as also shown, applications may also be displayed in list 210, such as an email application, a timeline application, application 3, application 4, . . . , etc. Other examples of applications are Whatsapp™ application (text messaging application), photo gallery application, calculator application, maps navigation application, calendar application, status update application, job ticket update application, task checklist application, stingray application, camera application, citation application etc. When an application is highlighted/selected, activation of the PTT button will cause the received voice to be input into the highlighted application. In FIG. 2, the highlighted and selected item (surrounded with a box) from list 210 comprises the email application. Thus in this example where email application is selected, when user press the PTT button and speak, email application will be launched automatically, and the user's voice will be transcripted to text and inserted into the email composer and then sent out to a predetermined email address. Thus the application name can be preconfigured to be associated with specific email address. The application name can also be more specifically shown with detail configuration (for example, "Email—Patrolling Team", "Email—Manager", "Email—Smith").

Other examples how a user's voice can be inserted into selected application follow:

If user selects a timeline application, pushes a PTT button and speaks "Found blue bag in suspect car", the user's voice will be converted into text, timestamped and inserted into timeline application.

If a police officer selects a camera application, pushes a PTT button and speaks "blue shirt yellow pant male" for example, user's voice will be converted into text, processed with natural language processing, and inserted to camera application to instruct camera to look for the person with male gender who is wearing a blue shirt and yellow pants.

If a paramedic selects map navigation application, presses PTT button and states "Queensbay Hospital", the voice will be converted to text and use the text "Queensbay Hospital" as search term to initiate navigation route instruction to Queensbay Hospital.

If the selected application is part of a site license, the selected application will periodically transmit a request to use the application over a particular application talkgroup specifically dedicated for that application. If an ACK is received over the application talkgroup, then the application is executed. However, if no ACK is received, or if a NACK is received, then the application is not executed.

List 210 preferably (but not necessarily) comprises a single list 210 having multiple lines. Each line comprises a name of a talkgroup or application. A single talkgroup name or application name exists per line. More particularly, list 210 preferably comprises a first line having a first talkgroup name, a second line having a first application name, a third line having a second talkgroup name, and a fourth line having a second application name.

In one embodiment, the talkgroup and application name list can be listed or grouped near to each other based on relevancy of the application to the talkgroup, for example, "Citation App" application name can be listed right after "Patrolling Talkgroup" talkgroup name as citation app are frequently used during patrolling jobs. The "Camera App" application name can be listed right after "Suspect Pursuit Talkgroup" talkgroup name as normally camera is needed during suspect pursuit to identify person of interest (suspect).

The relevancy of the talkgroup and application can be learned through logging user usage habits and frequency of using certain applications while in the middle of communicating in certain talkgroups. For example, if a camera application is always triggered through the PTT button immediately following or preceding a PTT to "Suspect Pursuit Talkgroup" the talkgroup and application may lie near each other on the list.

Figure 3:
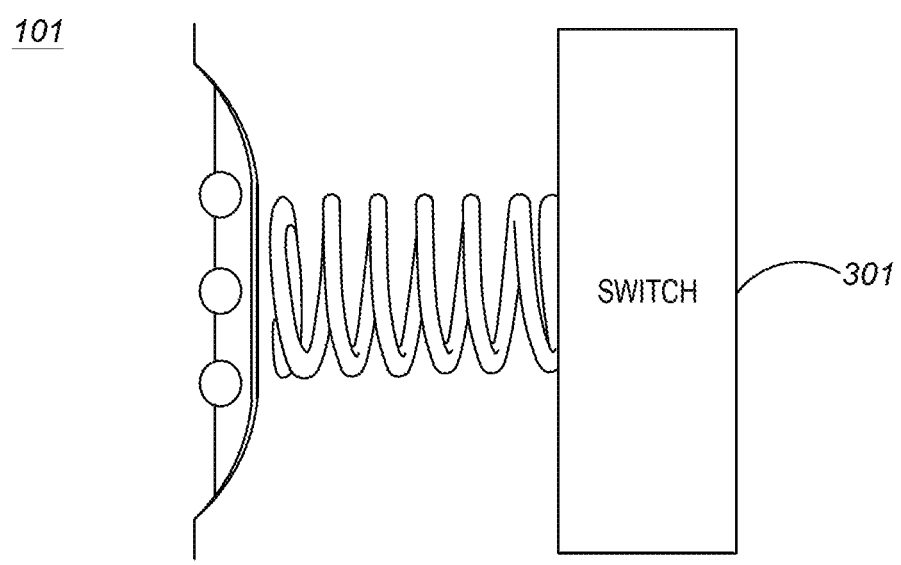
FIG. 3 illustrates a PTT button.

FIG. 3 is a cutaway view of PTT button 101. In this particular example, PTT button 101 also comprises a spring-actuated switch so that the physical depressing (pressing) of button 101 causes radio 100 to activate a half-duplex transmitter or collect voice for input into an application. During operation, switch 310 provides a PTT signal to logic circuitry in order to indicate that the PTT button has been pressed.

Figure 4:
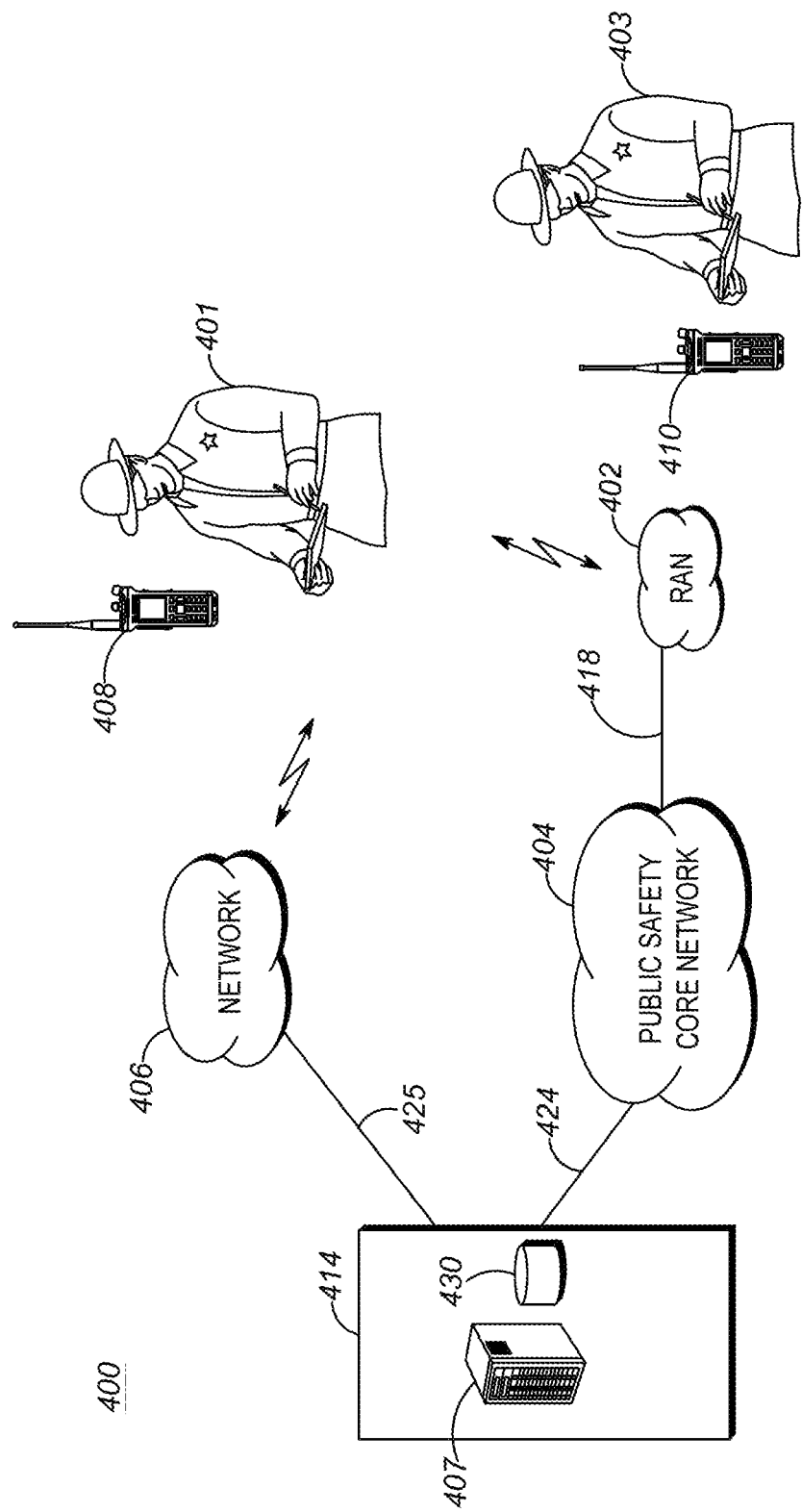
FIG. 4 depicts PTT radio that incorporates a PTT-to-Application function.

FIG. 4 illustrates a general operating environment for the present invention. Environment 400 includes one or more radio access networks (RANs) 402, a public-safety core network 404, devices 410-412, dispatch center 414, and communication links 425, 418, 424. In a preferred embodiment of the present invention, dispatch center 414 serves as a public-safety dispatch center 414. Application server 407 provides access to applications running on devices 410-412 as part of a concurrent site license. It should be noted that the term "server" and "logic circuitry" can be used interchangeably, and simply mean circuitry that grants permission so that devices 410-412 can execute applications as part of a concurrent site license as described above.

Application server 407 is coupled to database 430. Database 430 comprises information necessary for application server 407 to appropriately determine a maximum number of users allowed for each application, and grant/deny permission to use the application. For example, database 430 may comprise a list of software, a maximum number of users of the software, and a current number of users for the software (which may comprise a current number of users currently registered on and/or using a talkgroup specifically used for the software). Server 407 may modify data stored in database 430 as users execute software, or stop using software. It should be noted that although only one application server 407 is shown coupled to database 430, there may exist many servers 407 providing access services to devices 408-410, with each application server 407 sharing database 430 (or a copy of database 430).

Communication between application server 407 and devices 410-412 takes place through an intervening network such as, but not limited to a high-speed data network 406 such as a cellular communication system and/or public-safety core network 404 and RAN 402. Thus, as shown in FIG. 4, two separate networks exist, namely public-safety core network 404 for primarily carrying voice traffic from police radios, and a high-speed network 406 (e.g., Verizon, Spring, AT&T, . . . , etc.) for carrying high-speed data. Each of these networks may be utilized for transmitting requests to access software and ACKs/NACK s.

Each RAN 402 includes typical RAN elements such as base stations, base station controllers (BSCs), routers, switches, and the like, arranged, connected, and programmed to provide wireless service to user equipment (e.g., devices 410-412) operated by officers 401-403) in a manner known to those of skill in the relevant art. RANs may operate according to an industry standard land mobile radio (LMR) or cellular protocol such as, for example, the Project 25 (P25) standard defined by the Association of Public Safety Communications Officials International (APCO), the TETRA standard defined by the European Telecommunication Standards Institute (ETSI), the Digital Private Mobile Radio (dPMR) standard also defined by the ETSI, the Digital Mobile Radio (DMR) standard also defined by the ETSI, the Long Term Evolution (LTE) (including LTE-Advanced or LTE-Advanced Pro compliant with, for example, the 3GPP TS 36 specification series), or the 5G (including a network architecture compliant with, for example, the 3GPP TS 23 specification series and a new radio (NR) air interface compliant with the 3GPP TS 38 specification series) standard, among other possibilities, and over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), or a PTT over IP (PoIP) application may be implemented.

In a similar manner, network 406 includes elements such as base stations, base station controllers (BSCs), routers, switches, and the like, arranged, connected, and programmed to provide wireless service and data to user equipment (e.g., devices 410-412 operated by officers 401-403 in a manner known to those of skill in the relevant art.

Devices 410-412 may be any suitable computing and/or communication devices configured to engage in wireless communication over an air interface as is known to those in the relevant art. Devices 410-412 comprises any device capable of running and updating an application. For example, officer devices 412 may comprise a mobile device running an Android™ or iOS™ operating system and having a GPS receiver capable of determining a location. Mobile devices 408-410 may implement a direct-mode, conventional, or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long-range transmitter may implement a Long Term Evolution (LTE) (including LTE-Advanced or LTE-Advanced Pro compliant with, for example, the 3GPP TS 36 specification series) or 5G (including a new radio (NR) air interface compliant with the 3GPP TS 38 specification series) protocol, among other possibilities, over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), an LTE Direct or LTE Device to Device, or a PTT over IP (PoIP) application may be implemented. Direct mode LTE standards may additionally or alternatively be implemented as well, including but not limited to the LTE Direct device-to-device standard.

It should be noted that while only two officers 401-403 and two devices 408-410 are shown in FIG. 4, one of ordinary skill in the art will recognize that hundreds of officers and devices may actually exist in environment 400. Each officer will have their associated devices, and belong to a team. There may exist teams of one member, in which case no critical applications will be updated, since in a preferred embodiment N is a positive integer that is less than the number of team members.

During operation, devices 408-410 may store many applications for use by officers 401-403. Some of these applications may be used as part of a concurrent site license, which allows a maximum number of simultaneous users. With this in mind, when an officer executes an application that is part of a concurrent site license, the application will transmit an over-the-air signal to server 407 requesting use of the application. As discussed above, the transmission takes place over a talkgroup specifically dedicated for gaining permission to use the particular application. So, for example, an access request for first software takes place over a first application talkgroup, while an access request for second software takes place over a second application talkgroup, . . . , etc. Alternatively, a single talkgroup may be used for access request for all software, however, any request taking place over the single talkgroup must include an identification of the software which access is requested.

Server 407 accesses database 430 to determine how to respond to a received request. More particularly, server 407 accesses database 430 to determine if a maximum number of concurrent users of the software has been reached. If not, an ACK is transmitted over the application talkgroup, otherwise, a NACK is transmitted over the application talkgroup.

In order to determine that a user of software is still using the software, periodic access requests are transmitted to server 407. These access requests may be sent, for example, every 5 minutes.

Figure 5:
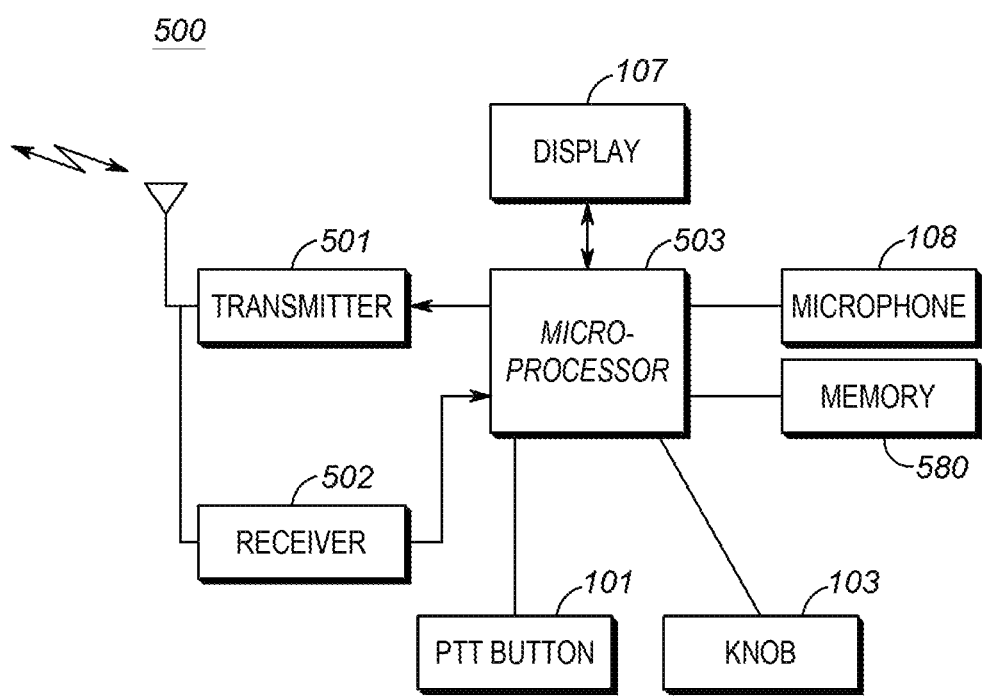
FIG. 5 is a block diagram of a radio/device of FIG. 4.

FIG. 5 is a block diagram of the radios shown in FIG. 1, FIG. 2, and FIG. 4. As shown, radio 500 may include transmitter 501, receiver 502, display 107, logic circuitry (processor) 503, memory 580, knob 103, microphone 108, and PTT button 101. In other implementations, radio 500 may include more, fewer, or different components.

Transmitter 501 and receiver 502 may be well known long-range and/or short-range transceivers that utilize a private 802.11 network set up by a building operator, a next-generation cellular communications network operated by a cellular service provider, or any public-safety network such as an APCO 25 network or the FirstNet broadband network. Transmitter 501 and receiver 502 may also contain multiple transmitters and receivers, to support multiple communications protocols simultaneously.

Logic circuitry 503 comprises a digital signal processor (DSP), general purpose microprocessor, a programmable logic device, an Application Processor, or application specific integrated circuit (ASIC) and is utilized to execute software, control information displayed on display 107, route any voice input accordingly, request for permission to use software, and allow or deny the use of software. It should be noted microprocessor 503 may perform some or all of the above tasks as part of executing software that is part of a concurrent site license.

As discussed above, display 107 is configured to display a both applications and talkgroups in a list 210, with only one application or talkgroup highlighted at a time.

During operation, logic circuitry 503 receives a rotation input from knob 103. More particularly, a rotation of knob 103 causes logic circuitry 503 to highlight a particular application or talkgroup displayed on display 107 (as shown in FIG. 2). Continued rotation of knob 103 causes logic circuitry to cycle through highlighting list 210 items. Logic circuitry 503 also receives an input from PTT button 101.

When switch 301 has been activated by pressing button 101, logic circuitry 503 will cause transmitter 501 to transmit voice received from a microphone 108 over the air on a highlighted talkgroup only if display 107 is highlighting a talkgroup (i.e., if a talkgroup is "selected").

When logic circuitry 503 launches an application from memory 580 that is part of a concurrent site license, the application will instruct logic circuitry 503 to use transmitter 501 to transmit a request to use the software. As discussed, the software request is sent over an application talkgroup. If an ACK is received over the talkgroup (via receiver 502), then logic circuitry executes the software for the user, otherwise, the software is not executed further. Alternatively, logic circuitry 503 will not execute the software if a NACK is received.

As is evident, the apparatus in FIG. 5 comprises an apparatus comprising memory 580 configured to store applications, an over-the-air transmitter configured 501 to transmit voice and data over a talkgroup, and an over-the-air receiver 502 configured to receive voice and data over a talkgroup.

As discussed above, logic circuitry 503 is provided and configured to execute a first application stored in the memory, cause the over-the-air transmitter to transmit a request for permission to use the first application over a first application talkgroup, wherein the first application talkgroup is dedicated for requesting permission to use of the first application as part of a concurrent site license, and receive permission on the first application talkgroup, via the over-the-air receiver, to use the first application over the first application talkgroup. Logic circuitry 503 will allow the first application to be executed or continue to be executed only when the permission is received.

In one embodiment, the first application talkgroup is only used to request and receive permission for the first application.

Additionally, logic circuitry 503 is also configured to execute a second application stored in the memory, cause over-the-air transmitter 501 to transmit a request for permission to use the second application over a second application talkgroup, wherein the second application talkgroup is dedicated for requesting permission to use of the second application as part of a concurrent site license, and receive permission to use the second application over the second application talkgroup. Logic circuitry 503 will allow the second application to be executed or continue to be executed only when the permission is received.

In one embodiment, the second application talkgroup is only used to request and receive permission for the second application.

Apparatus 500 as shown in FIG. 5 comprises an over-the-air transmitter 501 configured to transmit voice and data over a talkgroup, an over-the-air receiver 503 configured to receive voice and data over a talkgroup, memory 580 storing applications, a display 107 configured to display a list, the list comprising names of both talkgroups and applications, the list having one name from the talkgroup and application names selected and highlighted, and knob 103 configured to rotate, a rotation of the knob configured to cause a first application to be highlighted.

As discussed, logic circuitry 503 is provided and configured to cause over-the-air transmitter 501 to transmit a request for permission to use the first application over a first application talkgroup, wherein the first application talkgroup is dedicated for requesting permission to use of the first application as part of a concurrent site license. Logic circuitry 503 is also configured to receive permission over the first application talkgroup, via the over-the-air receiver, to use the first application, and allow the first application to be executed or continue to be executed only when the permission is received.

In one embodiment, the first application talkgroup is only used to request and receive permission for the first application.

Logic circuitry 503 is also configured to execute a second application stored in the memory, and cause the over-the-air transmitter to transmit a request for permission to use the second application over a second application talkgroup, wherein the second application talkgroup is dedicated for requesting permission to use of the second application as part of a concurrent site license. Logic circuitry is configured to receive permission to use the second application over the second application talkgroup (via receiver 502), and also configured to allow the second application to be executed or continue to be executed only when the permission is received.

In one embodiment, the second application talkgroup is only used to request and receive permission for the second application.

Figure 6:
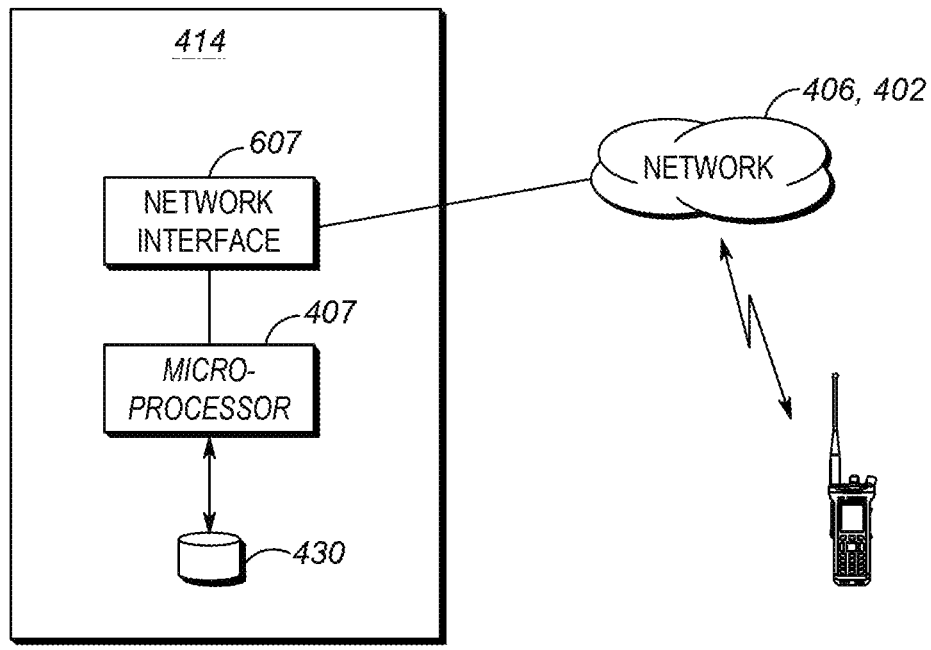
FIG. 6 is a block diagram of a dispatch center of FIG. 4

FIG. 6 is a block diagram of the dispatch center of FIG. 4. In this particular embodiment, server 407 is located within a dispatch center, however, one of ordinary skill in the art will recognize that server 407 may be located in any entity, so long as communication to radios is provided to server 407. As shown, dispatch center 414 may include network interface 607, which may be wired or wireless. If wireless, network interface 607 comprises at least an over-the-air transmitter and a receiver. Dispatch center 414 also includes logic circuitry 407 and databases 430. In other implementations, dispatch center 414 may include more, fewer, or different components.

Logic circuitry 407 serves as application server 407 and comprises a digital signal processor (DSP), general purpose microprocessor, a programmable logic device, or application specific integrated circuit (ASIC) and is utilized to grant permission to use applications as described above. Databases 430 comprise standard random-access memory.

In an illustrative embodiment, networks 106 and 402 are attached (i.e., connected) to dispatch center 414 through network interface 607 and communicates with processor 407. Network interface 607 includes elements including processing, modulating, and transceiver elements that are operable in accordance with any one or more standard or proprietary wired or wireless interfaces, wherein some of the functionality of the processing, modulating, and transceiver elements may be performed by means of processor 407.

As described, dispatch center comprises an apparatus comprising memory 430 configured to store a number of devices currently executing a first application, network interface 607 configured to transmit and receive voice and data over a talkgroup, and logic circuitry 407 configured to receive a request for permission to use the first application over a first application talkgroup, wherein the first application talkgroup is dedicated for requesting permission to use of the first application as part of a concurrent site license. Logic circuitry 407 is also configured to determine a number of devices currently using the first application, and grant permission to use the first application over the first application talkgroup when the number of devices currently using the first application is below a threshold. As discussed above, the permission is granted by transmitting the permission over the first application talkgroup (via network interface 607).

It should be noted that the number of devices currently executing an application may be determined by determining how many users currently occupy the first application talkgroup.

In one embodiment, the first application talkgroup is only used to request and receive permission for the first application.

Logic circuitry may also be configured to receive a request for permission to use a second application over a second application talkgroup, wherein the second application talkgroup is dedicated for requesting permission to use of the second application as part of a concurrent site license, determine a number of devices currently using the second application, and grant permission to use the second application over the second application talkgroup when the number of devices currently using the second application is below a threshold. As discussed above, wherein the permission is granted by transmitting the permission over the second application talkgroup (via network interface 607).

In one embodiment, the second application talkgroup is only used to request and receive permission for the second application and the number of devices currently using the second application is determined by determining how many users are currently using/registered on the second talkgroup.

Figure 7:
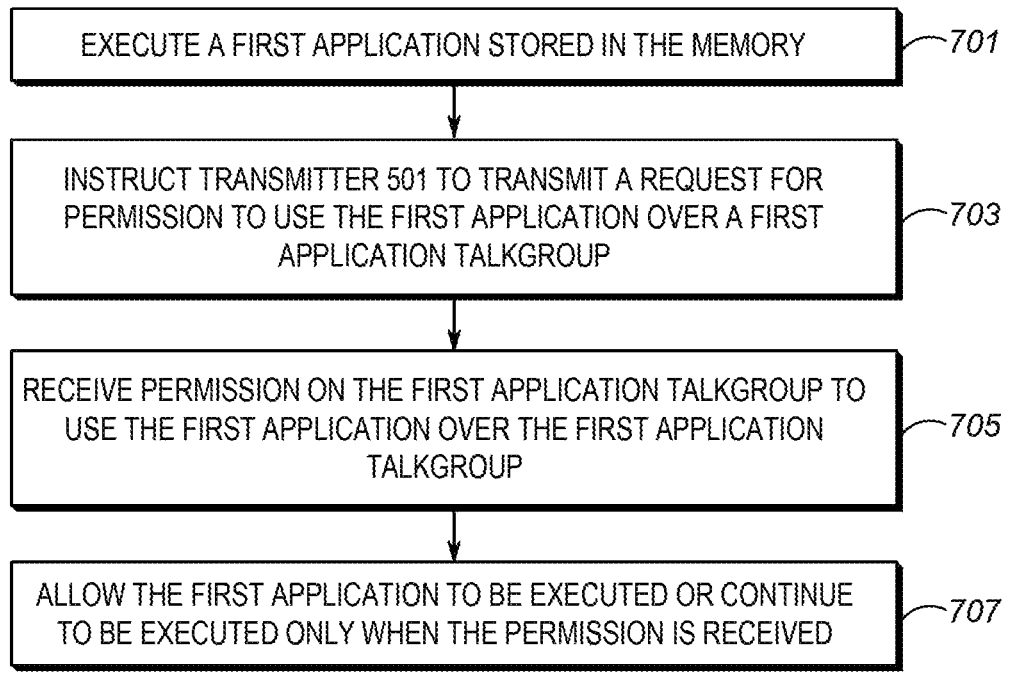
FIG. 7 is a flow chart showing operation of the radio of FIG. 4.

FIG. 7 is a flowchart showing operation of the device of FIG. 1. The logic flow begins at step 701 where logic circuitry 503 is executing a first application stored in the memory. At step 703, logic circuitry 503 instructs transmitter 501 to transmit a request for permission to use the first application over a first application talkgroup, wherein the first application talkgroup is dedicated for requesting permission to use of the first application as part of a concurrent site license.

At step 705, receiver 502 receives permission on the first application talkgroup to use the first application over the first application talkgroup and passes the permission to logic circuitry 503. At step 707, logic circuitry 503 allows the first application to be executed or continue to be executed only when the permission is received.

As discussed, the first application talkgroup is only used to request and receive permission for the first application. Additionally, a second application may be executed that is stored in the memory, and a request for permission to use the second application may be transmitted over a second application talkgroup, wherein the second application talkgroup is dedicated for requesting permission to use of the second application as part of a concurrent site license. Permission to use the second application may be received over the second application talkgroup, and the second application may be allowed to be executed or continue to be executed only when the permission is received.

Figure 8:
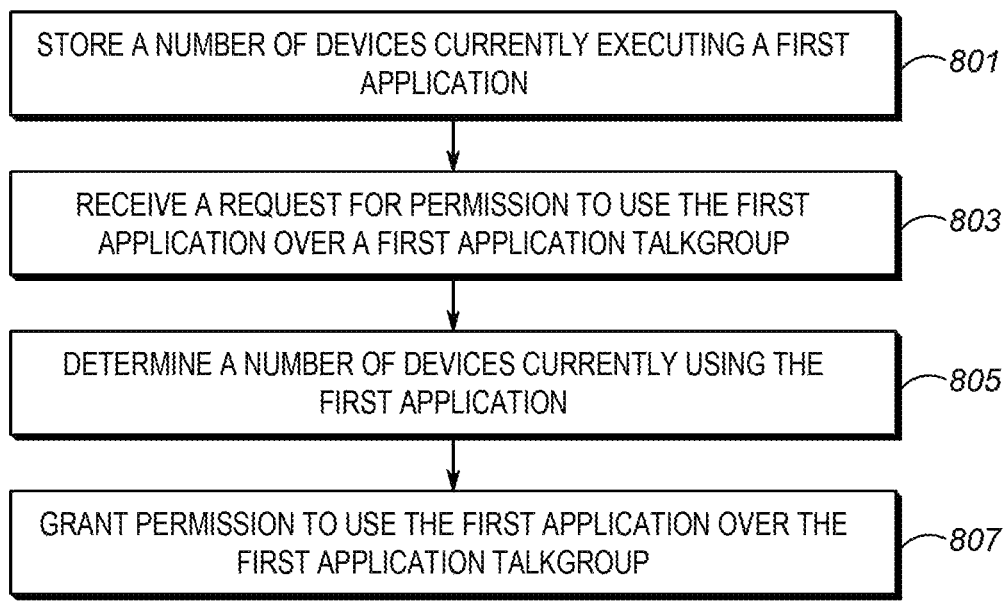
FIG. 8 is a flow chart showing operation of the dispatch center of FIG. 4.

FIG. 8 is a flowchart showing operation of the dispatch center 414. The logic flow begins at step 801 where memory 430 stores a number of devices currently executing a first application (which may comprise a number of users currently utilizing the first application talkgroup). At step 803, network interface 607 receives a request for permission to use the first application over a first application talkgroup and passes this request to logic circuitry 407. As discussed, the first application talkgroup is dedicated for requesting permission to use of the first application as part of a concurrent site license. At step 805, logic circuitry determines a number of devices currently using the first application and grants permission (step 807) to use the first application over the first application talkgroup when the number of devices currently using the first application is below a threshold.

As discussed, the permission is granted by transmitting the permission over the first application talkgroup.

Additionally, a request for permission to use a second application over a second application talkgroup may be received, wherein the second application talkgroup is dedicated for requesting permission to use of the second application as part of a concurrent site license. Logic circuitry 407 may then determine a number of devices currently using the second application (which may comprise a number of users currently using/registered on the second talkgroup), and grant permission to use the second application over the second application talkgroup when the number of devices currently using the second application is below a threshold.

In the foregoing specification, specific embodiments have been described. However, one of ordinary skill in the art appreciates that various modifications and changes can be made without departing from the scope of the invention as set forth in the claims below. For example, although the above description was given having application names displayed with various other talkgroups, in an alternate embodiment, the names of the applications need not be displayed as shown in FIG. 2. In fact, the names of the applications need not be displayed at all. In this particular embodiment, requests for permission and receipt of permission to execute particular applications will still take place using a dedicated application talkgroup, however, the user need not "tune" a selector knob to the particular application. The transmission of a request for permission will take place automatically by logic circuitry, without the need for tuning to a particular application talkgroup. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising: memory configured to store applications; an over-the-air transmitter configured to transmit voice and data over a talkgroup; an over-the-air receiver configured to receive voice and data over a talkgroup; logic circuitry configured to: execute a first application stored in the memory; cause the over-the-air transmitter to transmit a request for permission to use the first application over a first application talkgroup, wherein the first application talkgroup is dedicated for requesting permission to use of the first application as part of a concurrent site license and wherein the first application talkgroup is only used to request and receive permission for the first application; receive permission on the first application talkgroup, via the over-the-air receiver, to use the first application over the first application talkgroup; and allow the first application to be executed or continue to be executed only when the permission is received.

2. The apparatus of claim 1 wherein the logic circuitry is also configured to: execute a second application stored in the memory; cause the over-the-air transmitter to transmit a request for permission to use the second application over a second application talkgroup, wherein the second application talkgroup is dedicated for requesting permission to use of the second application as part of a concurrent site license; receive permission to use the second application over the second application talkgroup; and allow the second application to be executed or continue to be executed only when the permission is received.

3. The apparatus of claim 2, wherein the second application talkgroup is only used to request and receive permission for the second application.

4. An apparatus comprising: an over-the-air transmitter configured to transmit voice and data over a talkgroup; an over-the-air receiver configured to receive voice and data over a talkgroup; memory storing applications; a display configured to display a list, the list comprising names of both talkgroups and applications, the list having one name from the talkgroup and application names selected and highlighted; a knob configured to rotate, a rotation of the knob configured to cause a first application to be highlighted; logic circuitry configured to: cause the over-the-air transmitter to transmit a request for permission to use the first application over a first application talkgroup, wherein the first application talkgroup is dedicated for requesting permission to use of the first application as part of a concurrent site license and wherein the first application talkgroup is only used to request and receive permission for the first application; receive permission over the first application talkgroup, via the over-the-air receiver, to use the first application; and allow the first application to be executed or continue to be executed only when the permission is received.

5. The apparatus of claim 4 wherein the logic circuitry is also configured to: execute a second application stored in the memory; cause the over-the-air transmitter to transmit a request for permission to use the second application over a second application talkgroup, wherein the second application talkgroup is dedicated for requesting permission to use of the second application as part of a concurrent site license; receive permission to use the second application over the second application talkgroup; and allow the second application to be executed or continue to be executed only when the permission is received.

6. The apparatus of claim 5, wherein the second application talkgroup is only used to request and receive permission for the second application.

7. A method comprising the steps of: executing a first application stored in a memory; transmitting a request for permission to use the first application over a first application talkgroup, wherein the first application talkgroup is dedicated for requesting permission to use of the first application as part of a concurrent site license and wherein the first application talkgroup is only used to request and receive permission for the first application; receiving permission on the first application talkgroup to use the first application over the first application talkgroup; and allowing the first application to be executed or continue to be executed only when the permission is received.

8. The method of claim 7 further comprising the steps of: executing a second application stored in a memory; transmitting a request for permission to use the second application over a second application talkgroup, wherein the second application talkgroup is dedicated for requesting permission to use of the second application as part of a concurrent site license; receiving permission to use the second application over the second application talkgroup; and allowing the second application to be executed or continue to be executed only when the permission is received.

9. The method of claim 8, wherein the second application talkgroup is only used to request and receive permission for the second application.

* * * * *